US010547201B2

(12) United States Patent
Liu et al.

(10) Patent No.: US 10,547,201 B2
(45) Date of Patent: Jan. 28, 2020

(54) ENERGY STORAGE SYSTEM AND OPERATION METHOD THEREOF

(71) Applicants: Wuhan Institute of Technology, Wuhan (CN); China National Coal Group Corp., Beijing (CN); Wuhan Micro Hydrogen New Energy Co., Ltd., Wuhan (CN)

(72) Inventors: Jian Liu, Wuhan (CN); Zenglun Guan, Wuhan (CN); Zhongwen Zhang, Wuhan (CN); Rucheng Liu, Wuhan (CN); Bing Yan, Wuhan (CN); Zhenshen Lou, Wuhan (CN); Yang Wang, Wuhan (CN); Xiaohu Liu, Wuhan (CN); Shihong Qin, Wuhan (CN); Xiaoling Wen, Wuhan (CN); Zicheng Li, Wuhan (CN)

(73) Assignees: WUHAN INSTITUTE OF TECHNOLOGY, Wuhan (CN); CHINA NATIONAL COAL GROUP CORP., Beijing (CN); WUHAN MICRO HYDROGEN NEW ENERGY CO., LTD., Wuhan (CN)

( * ) Notice: Subject to any disclaimer, the term of this patent is extended or adjusted under 35 U.S.C. 154(b) by 134 days.

(21) Appl. No.: 15/834,007

(22) Filed: Dec. 6, 2017

(65) Prior Publication Data

US 2018/0159362 A1 Jun. 7, 2018

(30) Foreign Application Priority Data

Dec. 6, 2016 (CN) .......................... 2016 1 1108194

(51) Int. Cl.
*H02J 7/34* (2006.01)
*H02M 3/158* (2006.01)
(Continued)

(52) U.S. Cl.
CPC .......... *H02J 7/34* (2013.01); *H01M 10/4264* (2013.01); *H02J 7/345* (2013.01); *H02M 1/36* (2013.01);
(Continued)

(58) Field of Classification Search
CPC ........ H02J 7/34; H02J 7/345; H01M 10/4264; H02M 1/36; H02M 3/158; H02M 3/1582; H02M 2001/007
(Continued)

(56) References Cited

U.S. PATENT DOCUMENTS 9,013,144 B2 * 4/2015 Cooley ................. H01G 11/58
320/112

* cited by examiner

*Primary Examiner* — Hal Kaplan
(74) *Attorney, Agent, or Firm* — Matthias Scholl P.C.; Matthias Scholl

(57) ABSTRACT

An energy storage system, including: a first switch and a first inductor connected in series and connected to a positive electrode of an external DC system; a pre-stage bidirectional buck-boost conversion circuit, the circuit including a first terminal, a second terminal, and a third terminal; a pre-charge circuit, a fourth switch, and a super-capacitor sequentially connected in series, two terminals of a series structure resulting therefrom being connected to the third terminal of the pre-stage bidirectional buck-boost conversion circuit and the negative electrode of the external DC system, respectively; a post-stage bidirectional buck-boost conversion circuit, the circuit including a first terminal, a second terminal, and a third terminal; and a battery, a second switch, and a second inductor connected in series.

10 Claims, 7 Drawing Sheets

(51) Int. Cl.
  *H01M 10/42* (2006.01)
  *H02M 1/36* (2007.01)
  *H02M 1/00* (2006.01)
(52) U.S. Cl.
  CPC ......... *H02M 3/158* (2013.01); *H02M 3/1582* (2013.01); *H02M 2001/007* (2013.01)
(58) Field of Classification Search
  USPC .......................................................... 307/46
  See application file for complete search history.

ENERGY STORAGE SYSTEM AND OPERATION METHOD THEREOF

CROSS-REFERENCE TO RELATED APPLICATIONS

Pursuant to 35 U.S.C. § 119 and the Paris Convention Treaty, this application claims foreign priority to Chinese Patent Application No. 201611108194.2 filed Dec. 6, 2016, the contents of which and any intervening amendments thereto are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The present disclosure relates to the field of storage and release of electric energy, and, in particular, to an energy storage system and an operation method thereof.

Description of the Related Art

To improve the performance of energy storage devices, some researchers have proposed to use a combination of a battery and a super-capacitor. The main topology is of a battery and a super-capacitor connected in parallel, or a super-capacitor and a battery connected respectively with a DC/DC conversion circuit and then connected in parallel. In case of an AC system, a DC/AC conversion circuit is also provided. The goal is to make use of advantages of both energy storage components to achieve better regulation and control effects. In most high voltage and high-power situations, sub-modules are connected in parallel, or in cascade, or alternatively are connected to the system after being amplified through a transformer. However, current energy storage systems still suffer from many problems, for example:

(1) In high voltage and high power situations, in consideration of costs, batteries are used as energy storage components, and new and expensive energy storage components are only used in some demonstration projects. Devices that use batteries as energy storage components mainly aim at providing backup support to the system in case of emergencies and grid failures, or enabling load shifting so as to reduce the peak demand of electricity and capital investment in the power generation system. However, in this mode, it is difficult to adjust rapidly to large power fluctuations and impacts occurring in the power supply.

(2) The large number of batteries connected in series results in a demand for high consistency of battery parameters, which leads to a high cost of the overall device. In addition, due to battery charge and discharge cycle limits, frequent power fluctuations in the system cannot yet be properly controlled.

(3) Because the energy capacity of the super-capacitor is proportional to the square of the voltage, in some systems where the super-capacitor is directly connected in parallel to the external DC system, the energy storage capacity of the super-capacitor cannot be exploited. Also, too frequent voltage fluctuations in the external DC system, have a negative impact on the super-capacitor itself.

(4) If the battery and the super-capacitor are connected in parallel, or the battery and the super-capacitor are connected in parallel after passing through the DC/DC converter, despite a super-capacitor being added in similar systems, when frequent fluctuations in power or voltage occur in a large part of the system, the voltage and current are still applied to both energy storage components at the same time; therefore, the negative impact on the battery still exists, and it is difficult to achieve efficient energy absorption and release.

(5) The super-capacitor has a low internal resistance and an energy capacity much larger than that of normal capacitors, the magnitude and duration of impact current of the super-capacitor during power-on will far exceed that of the normal capacitors. Therefore, a pre-charging circuit with a larger power needs to be provided.

SUMMARY OF THE INVENTION

In view of the technical problems mentioned above, it is one objective of the present disclosure to provide an energy storage system and an operation method thereof arranging a super-capacitor before a battery, so as to absorb and release frequent and instantaneous high power through proper control, and thereby improving regulation speed and performance of the system, reducing the number of high-current charge and discharge of the battery, as well as charge and discharge cycles thereof, and improving the lifetime of the battery.

To achieve the above objective, in accordance with one embodiment of the invention, there is provided an energy storage system, comprising:
  a first switch and a first inductor connected in series and connected to a positive electrode of an external DC system;
  a pre-stage bidirectional buck-boost conversion circuit, the circuit comprising a first terminal, a second terminal, and a third terminal, the first terminal being connected to the first switch and the second terminal being connected to a negative electrode of the external DC system;
  a pre-charge circuit, a fourth switch, and a super-capacitor sequentially connected in series, two terminals of a series structure resulting therefrom being connected to the third terminal of the pre-stage bidirectional buck-boost conversion circuit and the negative electrode of the external DC system, respectively;
  a post-stage bidirectional buck-boost conversion circuit, the circuit comprising a first terminal, a second terminal, and a third terminal, the second terminal and the third terminal of the post-stage bidirectional buck-boost conversion circuit being connected to the second terminal and the third terminal of the pre-stage bidirectional buck-boost conversion circuit, respectively; and
  a battery, a second switch, and a second inductor connected in series, two terminals of a series structure resulting therefrom being connected to the first terminal of the post-stage bidirectional buck-boost conversion circuit and the negative electrode of the external DC system, respectively.

In a class of this embodiment, the pre-stage bidirectional buck-boost conversion circuit comprises a first power electronic device and a second power electronic device; the post-stage bidirectional buck-boost conversion circuit comprises a third power electronic device and a fourth power electronic devices; and each of the first power electronic device, the second power electronic device, the third power electronic device, and the fourth power electronic device comprises an IGBT transistor and an anti-parallel diode connected in parallel with each other.

In a class of this embodiment, the first inductor and the second inductor are both smoothing inductors.

In a class of this embodiment, the first switch, the second switch, and the fourth switch are independently selected from the group consisting of a circuit breaker, a contactor, a load switch, a fuse, and any combination thereof.

In a class of this embodiment, the pre-charge circuit comprises a third switch connected in series with the super-capacitor and a charging resistor connected in parallel with the third switch.

In a class of this embodiment, the third switch selected from the group consisting of a circuit breaker, a contactor, a load switch, a fuse, and any combination thereof.

In accordance with another embodiment of the present disclosure, there provided is a method for absorbing and releasing energy by using the energy storage system mentioned above, the method comprising:

in an energy absorption state of the energy storage system,
1) when the external DC system generates energy feedback, in the event of impact from an instantaneous surge current, charging the super-capacitor directly through the second power electronic device; 2) when the surge ends or if no impact from a surge current occurs in the charging process, performing PWM control on the second power electronic device, so that the pre-stage bidirectional buck-boost conversion circuit operates in a boosting mode to absorb energy; and performing PWM control on the third power electronic device, so that the post-stage bidirectional buck-boost conversion circuit functions as a buck circuit to charge the battery; 3) if the voltage of the super-capacitor is higher than a rated value at the end of the charging control, performing PWM control on the third power electronic device so that the post-stage bidirectional buck-boost conversion circuit continues to function as a buck circuit until the voltage of the super-capacitor is restored to a rated value in preparation for the next energy absorption;

in an energy release state of the energy storage system, 1) when an instantaneous large power shortage occurs in the external DC system, controlling the first power electronic device to complete instantaneous high-current energy delivery from the super-capacitor to the external DC system; 2) when compensation for the large power shortage is completed or no large power shortage occurs in the charging process, performing PWM control on the first power electronic device so that the pre-stage bidirectional buck-boost conversion circuit operates in a bucking mode to output a discharge current; and performing PWM control on the fourth power electronic device so that the post-stage bidirectional buck-boost conversion circuit functions as a boost circuit to maintain the voltage of the super-capacitor; 3) at the end of the discharge control, if the voltage of the super-capacitor is lower than a rated value, performing PWM control on the fourth power electronic device so that the post-stage bidirectional buck-boost conversion circuit functions as a boost circuit until the voltage of the super-capacitor is restored to a rated value in preparation for the next energy release.

In another aspect, the present disclosure further provides an operation method of the energy storage system mentioned above, the method comprising:

(1) determining whether an actual voltage Uout of the external DC system is greater or less than a voltage Usc across the super-capacitor, and proceeding to (2) if it is greater, and proceeding to (3) if it is less;
(2) continuously charging the super-capacitor via the external DC system through the first inductor, the first switch, and the anti-parallel diode of the first power electronic device, and determining whether the actual voltage Uout of the external DC system is greater than a maximum tolerable voltage Usc across the super-capacitor; and if so, turning off the first switch, so that the post-stage bidirectional buck-boost conversion circuit transfers the energy from the super-capacitor to the battery and stops the operation once the voltage Usc across the super-capacitor is restored to a rated voltage across the super-capacitor, and proceeding to (3), if not, continuing with the charging process;
(3) receiving an energy control signal from the outside and determining whether the energy control signal is an energy absorption control signal or an energy release control signal, and if it is an energy absorption control signal, proceeding to (4), and if it is an energy release control signal, proceeding to (5);
(4) charging the super-capacitor from the external DC system through a boost circuit comprising the first inductor, the first switch, the anti-parallel diode of the first power electronic device, and the second power electronic device in that order from left to right, charging the battery by the super-capacitor through a buck circuit comprising the second switch, the second inductor, the third power electronic device, and the anti-parallel diode of the fourth power electronic device in that order from left to right, where charging ends when energy in the battery is above a first threshold; and
(5) supplying power to the external DC system by the super-capacitor through a buck circuit comprising the third switch, the fourth switch, the first power electronic device, and the anti-parallel diode of the second power electronic device in that order from right to left, and at the same time, supplying power to the super-capacitor by the battery through a boost circuit comprising the second switch, the second inductor, the anti-parallel diode of the third power electronic device, and the fourth power electronic device in that order from right to left, where the process ends when energy in the battery is below a second threshold.

In a class of this embodiment, the method further comprises pre-charging the energy storage system prior to (1), the pre-charging the energy storage system comprising:

A) when the hybrid energy storage device is not powered on, turning off all the switches, and once the hybrid energy storage device is powered on, determining whether the relationship between the voltage Usc across the super-capacitor and the voltage Ub of the battery satisfies the following equation (1), and proceeding to sub-step B) if yes, otherwise continuing waiting and determining:

$$Usc < Kset1 \cdot Ub \quad (1)$$

where Kset1 is a threshold coefficient of a value less than 1, generally taken as 0.95;

B) turning on the second switch and the fourth switch, and charging the super-capacitor continuously by the battery through a boost circuit comprising the second inductor, the second switch, the third power electronic device, and the fourth switch;

C) determining whether the relationship between the voltage Usc across the super-capacitor and a rated voltage Uout rated of the external DC system satisfies the following equation (2), and ending pre-charging of the super-capacitor if yes, otherwise continuing waiting and determining:

$$Usc > Kset2 \cdot Uout\_rated \quad (2)$$

where Kset2 is a threshold coefficient, with Kset2>1;

D) turning on the first switch and the third switch once the pre-charging is completed.

In a class of this embodiment, when the actual voltage Uout of the external DC system and the voltage Usc across the super-capacitor satisfy the following formula during charging in step (4), the first inductor, the first switch, the first power electronic device, and the second power electronic stop their operation. At this time, the third power electronic device, the fourth power electronic device, the second capacitor, and the second inductor remain in a current operating mode and stop operation once the voltage Usc across the super-capacitor is restored to the rated voltage across the super-capacitor:

$$Uout < Kset3 \cdot Usc$$

where Kset3 is a threshold coefficient of a value less than or equal to 0.1.

The beneficial effects of the energy storage system and operation method thereof of the present disclosure are summarized as follows:

(1) According to the present disclosure, as the super-capacitor is placed before the battery, frequent and instantaneous high power can be absorbed and released through proper control. As such, regulation speed and performance of the system can be improved, and high-current charges and discharges and charge and discharge cycles of the battery can be reduced, thereby improving life time of the battery.

(2) According to the present disclosure, the super-capacitor is charged through a boost circuit comprising the first inductor, the first switch, the anti-parallel diode of the first power electronic device, and the second power electronic device in that order from left to right, and power is supplied to the external DC system through a buck circuit comprising the third switch, the fourth switch, the first power electronic device, the anti-parallel diode of the second power electronic device in that order from right to left, so that the energy storage system can achieve efficient energy storage and release over a wider voltage range.

(3) The battery operating as an energy storage component is arranged at the rear end of the super-capacitor to absorb and release energy over a long time period. The presence of the buck-boost circuit can reduce the number of battery cells connected in series. Pre-charged energy may alternatively be supplied by a battery pack.

(4) According to the present disclosure, by providing the pre-charge circuit, devices can be protected from damage caused by impact from an instantaneous current during power-on, and fault current can be limited effectively by a current limiting resistor in the event of fault.

(5) The invention features high integration, a compact structure and relatively simple control, and can make better use of the characteristics of both energy storage components, i.e., the super-capacitor and the battery, compared with a parallel connection.

DETAILED DESCRIPTION OF THE EMBODIMENTS

The present disclosure will be further described with reference to specific examples and drawings.

Figure 1:
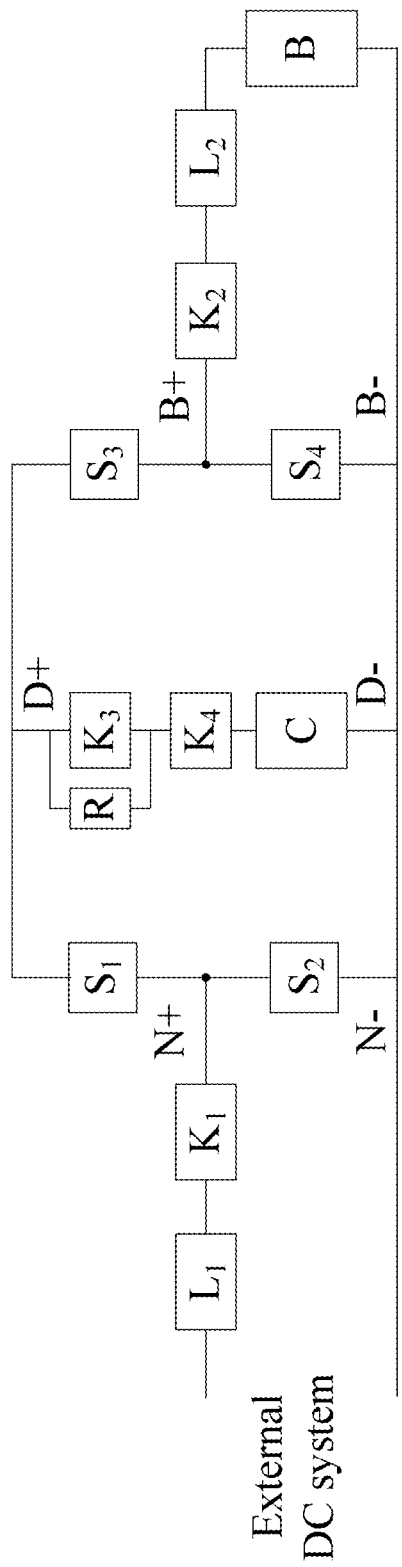
FIG. 1 is a circuit diagram of an energy storage system according to one embodiment of the present disclosure.

The present disclosure provides an energy storage system. As shown in FIG. 1, the system comprises:

a first switch K1 and a first inductor L1 connected in series with each other and with a positive electrode of an external DC system;

a pre-stage bidirectional buck-boost conversion circuit having a first terminal connected to the first switch K1 and a second terminal connected to a negative electrode of the external DC system;

a pre-charge circuit, a fourth switch K4, and a super-capacitor C sequentially connected in series, the two terminals connected in series being respectively connected to a third terminal of the pre-stage bidirectional buck-boost conversion circuit and the negative electrode of the external DC system;

a post-stage bidirectional buck-boost conversion circuit having a second terminal and a third terminal respectively connected to the second terminal and the third terminal of the pre-stage bidirectional buck-boost conversion circuit; and a battery B, a second switch K2, and a second inductor L2 connected in series with each other, the two terminals connected in series being respectively connected to the first terminal of the post-stage bidirectional buck-boost conversion circuit and the negative electrode of the external DC system.

The pre-stage bidirectional buck-boost conversion circuit comprises a first power electronic device $S_1$ and a second power electronic device $S_2$. The post-stage bidirectional buck-boost conversion circuit comprises a third power electronic device $S_3$ and a fourth power electronic device $S_4$. Each of the first power electronic device $S_1$, the second power electronic device $S_2$, the third power electronic device $S_3$, and the fourth power electronic device $S_4$ comprises an IGBT transistor and an anti-parallel diode connected in parallel to each other.

Both the first inductor L1 and the second inductor L2 are smoothing inductors.

The first switch K1, the second switch K2, and the fourth switch K4 are independently selected from the group consisting of a circuit breaker, a contactor, a load switch, a fuse, and any combination thereof.

The pre-charge circuit comprises a third switch K3 connected in series with the super-capacitor C and a charging resistor R connected in parallel with the third switch K3.

The third switch K3 is a combination of a circuit breaker, a contactor, a load switch, and a fuse.

A method for absorbing and releasing energy by using the energy storage system mentioned above comprises the following steps.

In an energy absorption state of the energy storage system: 1) when the external DC system generates energy feedback, in the event of impact from an instantaneous surge current, the super-capacitor C is charged directly through the second power electronic device S2; 2) when the surge ends or if no impact from a surge current occurs in the charging process, PWM control is performed on the second power electronic device $S_2$ so that the pre-stage bidirectional buck-boost conversion circuit operates in a boosting mode to absorb energy; and PWM control is performed on the third power electronic device $S_3$ so that the post-stage bidirectional buck-boost conversion circuit functions as a buck circuit to charge the battery; 3) if the voltage of the super-capacitor C is higher than a rated value at the end of the charging control, PWM control is performed on the third power electronic device $S_3$ so that the post-stage bidirectional buck-boost conversion circuit functions as a buck circuit until the voltage of the super-capacitor C is restored to a rated value in preparation for the next energy absorption.

In an energy release state of the energy storage system: 1) when an instantaneous large power shortage occurs in the external DC system, the first power electronic device $S_1$ is controlled to complete instantaneous high-current energy delivery from the super-capacitor C to the external DC system; 2) when compensation for large power shortage is completed or if no large power shortage occurs in the charging process, PWM control is performed on the first power electronic device $S_1$ so that the pre-stage bidirectional buck-boost conversion circuit operates in a bucking mode to output a discharge current; and PWM control is performed on the fourth power electronic device $S_4$ so that the post-stage bidirectional buck-boost conversion circuit functions as a boost circuit so as to maintain the voltage of the super-capacitor C; 3) at the end of the discharging control, if the voltage of the super-capacitor C is lower than a rated value, PWM control is performed on the fourth power electronic device $S_4$ so that the post-stage bidirectional buck-boost conversion circuit functions as a boost circuit until the voltage of the super-capacitor C is restored to a rated value in preparation for the next energy feedback.

To make the technical solutions and advantages of the present disclosure more apparent, the present disclosure will be described in further details hereinafter with reference to an electrically driven mining truck system with an external DC system's voltage of 1500 V. 1500 V is taken as an example mainly because systems such as subways and electrically driven mining trucks typically have an internal DC system's voltage of 1500 V, and similar devices experience frequent energy absorption and feedback release during starting and braking. At present, feedback braking energy is consumed by heating on a resistance grid in most occasions. The hybrid energy storage device of the invention can desirably absorb this part of energy and release it during normal operation of the system, thereby reducing energy consumption of the system and improving energy-saving efficiency.

It should be understood that the specific embodiments described herein are only used to explain the present disclosure, and are not intended to limit the present disclosure.

Figure 2:
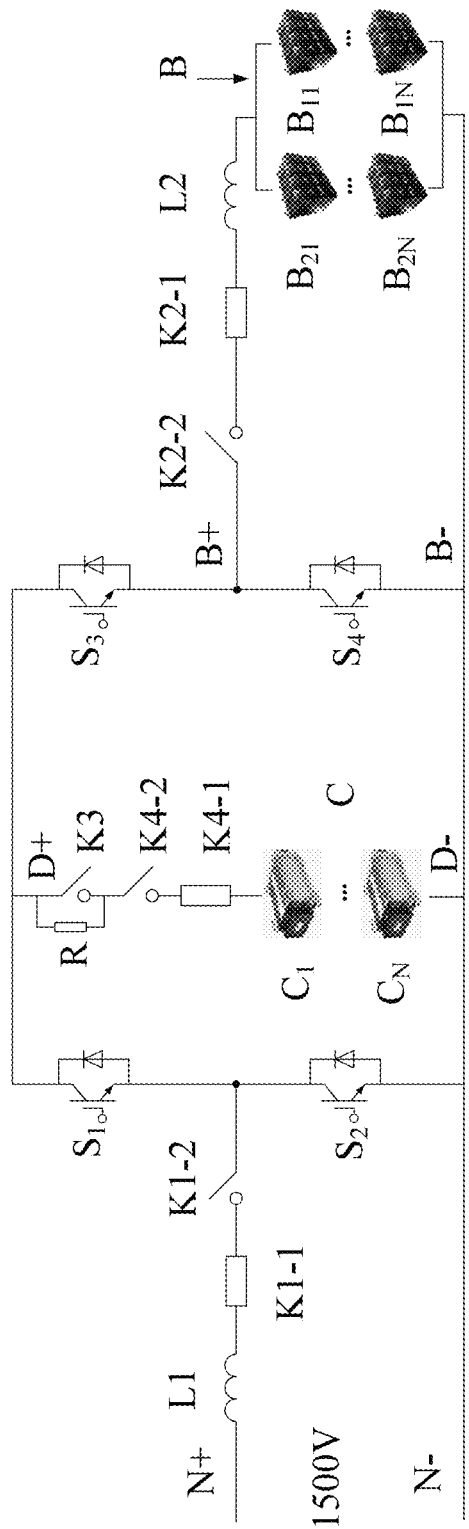
FIG. 2 is a detailed circuit diagram of an energy storage system according to one embodiment of the present disclosure.

As shown in FIG. 2, two terminals of the energy storage system according to the present disclosure are respectively connected to a positive electrode and negative electrode of a 1500 V external DC system. The first inductor L1, the first quick fuse K1-1, and the first contactor K1-2 are connected in series. Parameters of the first inductor L1 are designed in compliance with the principle that the charge and discharge currents of the super-capacitor C should remain continuous. Voltage levels and current parameters of the first quick fuse K1-1 and the first contactor K1-2 are determined in accordance with the maximum voltage and capacity of the system taking into account a certain margin. In this embodiment, the first power electronic device S1 and the second power electronic device S2 both comprises an IGBT device of a 3300 V voltage level and an anti-parallel diode connected in parallel.

The pre-stage bidirectional buck-boost conversion circuit adopts the super-capacitor from MAXWELL, USA as a power type energy storage component. At the voltage level of 1500 V, a 48V/165 F super-capacitor module is selected for series connection in consideration of both the number of modules in series and the voltage level. Each series comprises a number of 35-40 modules, that is, the value of N in $C_N$ from FIG. 2 is 35-40. Such a number can be calculated as a function of the magnitude of the instantaneous power of the system. The third switch K3 is the third contactor, and the fourth switch K4 comprises the fourth contactor K4-2 and the second quick fuse K4-1. Their voltage levels and current parameters are determined in accordance with the maximum voltage of the external DC system taking into account a certain margin. The charging resistor R is connected in parallel with the third contactor. Since the super-capacitor C has a larger energy capacity than an ordinary capacitor and thus has a higher pre-charging power and a longer charging time, pre-charging is preferably performed by the battery inside the device to avoid impacts on external systems. Pre-charge resistance may be chosen as 20 ohms. At a voltage level of 650 V of the battery B, the maximum pre-charge current is 32.5 A.

In the post-stage bidirectional buck-boost conversion circuit, a low-cost lead-acid battery is used as an energy type energy storage component. To reduce the number of battery cells B in series, the rated voltage level is set to 650 V. Accordingly, with a lead-acid battery of a rated voltage of 12 V, 54 battery cells need to be connected in series, that is, the value of N in $B_{1N}$ in FIG. 2 is 54. If it is necessary to extend energy storage time of the system, multiple battery packs may be connected in parallel.

The Battery B is connected to the post-stage buck-boost conversion circuit comprising the third power electronic device $S_3$ and the fourth power electronic device $S_4$ (both comprising an IGBT device of a 3300 V voltage level and an anti-parallel diode) through the second inductor L2, the second quick fuse K2-1, and the second contactor K2-2. Parameters of the second inductor are designed in compliance with the principle that the charge and discharge currents of the battery B should remain continuous. Voltage levels and current parameters of the second quick fuse K2-1 and the second contactor K2-2 are determined in accordance with the maximum voltage and capacity of the system taking into account a certain margin.

This system will be described with reference to a schematic structural diagram and a hypothetic operation environment hereinafter. It is to be emphasized that this operation environment is used only for detailed description of the system. It is assumed that the super-capacitor can tolerate an impact current of 1000 A, the super-capacitor has a rated voltage of 1500 V, and the battery has a rated charge and discharge current of 80 A and a maximum charge and discharge current of 150 A.

Figure 3A:
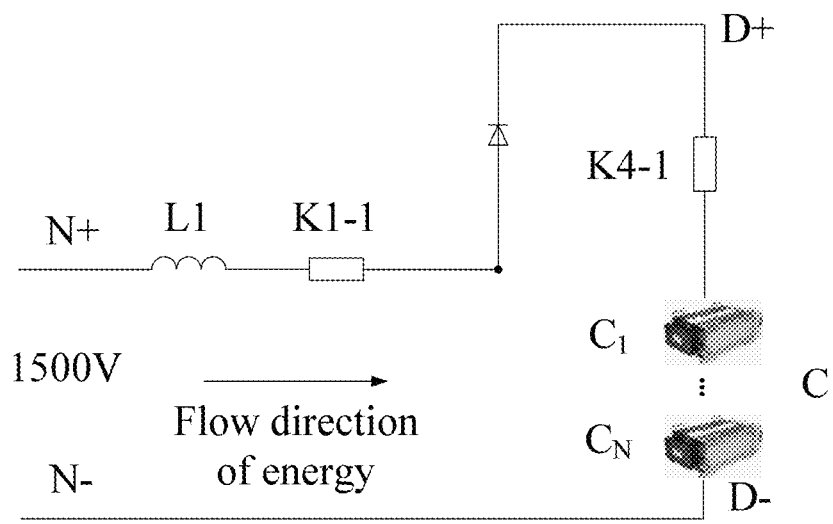
FIGS. 3A-3B are schematic diagrams showing operating modes of instantaneous high-power energy absorption of an energy storage system according to one embodiment of the present disclosure.
Figure 3B:
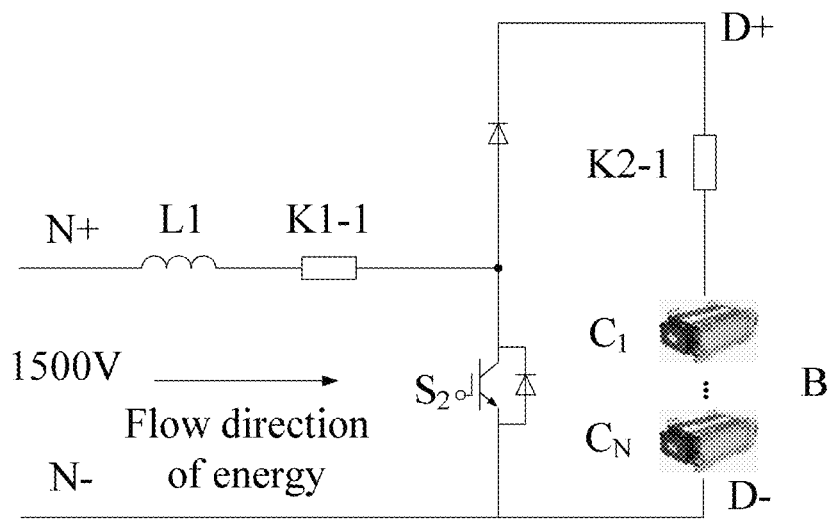

FIGS. 3A-3B are schematic diagrams showing operating modes of instantaneous high-power energy absorption of the energy system according to the present disclosure. When a mining truck brakes, the external DC system will initially experience a sudden voltage rise, and produce a large braking current. In the event of a braking current greater than 150 A, if the battery is directly charged, severe impact will be caused to the battery, thereby affecting lifetime of the battery. Therefore, the system is set to enter the state shown in FIG. 3A. The braking energy is charged directly to the super-capacitor through the anti-parallel diode of $S_1$, so that energy is absorbed and impact from high current on the battery can be prevented. At the end of the initial braking time period, the braking voltage and current will gradually decrease. Once the braking current is lower than 150 A, the system will operate in the state shown in FIG. 3B, in which the switching device $S_2$ are controlled through a PI control algorithm to operate in a pulse width modulation state for efficient absorption of energy generated in the later stage of braking. Then the entire system enters the operating mode shown in FIG. 4. If the initial braking current is lower than 150 A, the system enters directly the operating mode shown in FIG. 4.

Figure 4:
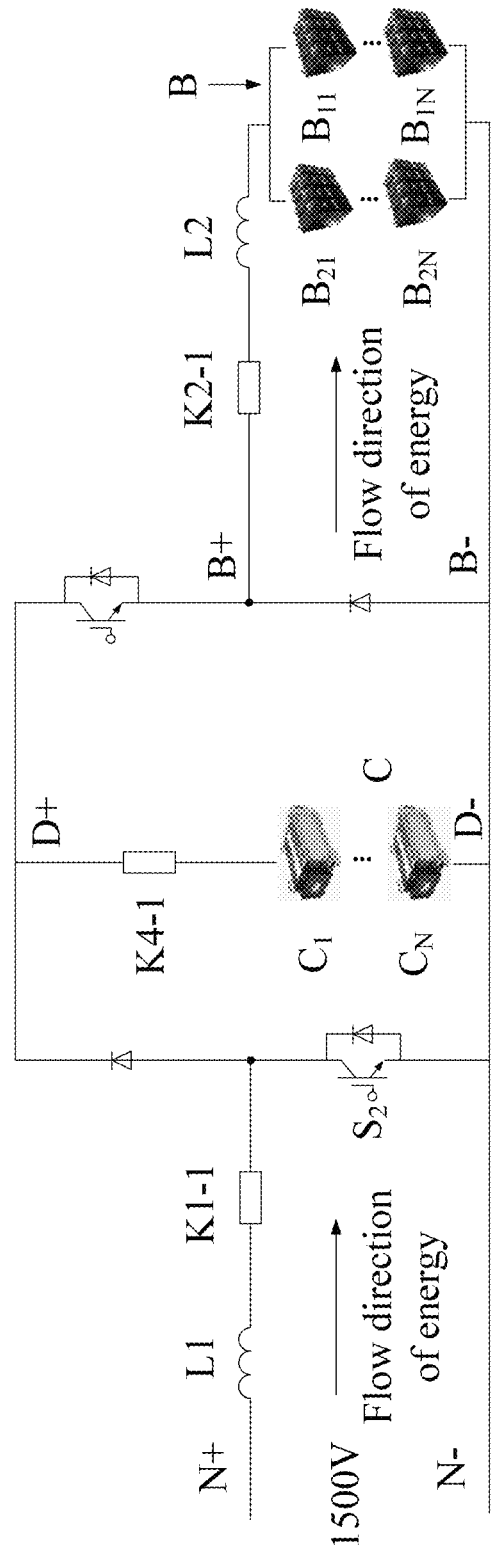
FIG. 4 is a schematic diagram showing an operating mode of normal state energy absorption of an energy storage system according to one embodiment of the present disclosure.

FIG. 4 is a schematic diagram showing an operating mode of normal state energy absorption of the energy storage system according to the present disclosure. In this case, the braking current is maintained at 60-100 A, and the battery can be charged directly. At this time, the second power electronic device $S_2$ and the third power electronic device $S_3$ are controlled through the PI control algorithm, so that the pre-stage circuit operates in a boosting mode to maintain a stable voltage across the capacitor C, and the post-stage circuit operates in a bucking mode to charge the battery B. If the voltage across the super-capacitor C exceeds 1500 V, the third power electronic device $S_3$ is constantly controlled to maintain the bucking mode of the post-stage circuit until the voltage of the super-capacitor C is maintained at 1500 V, in preparation for the next charging process.

Figure 5:
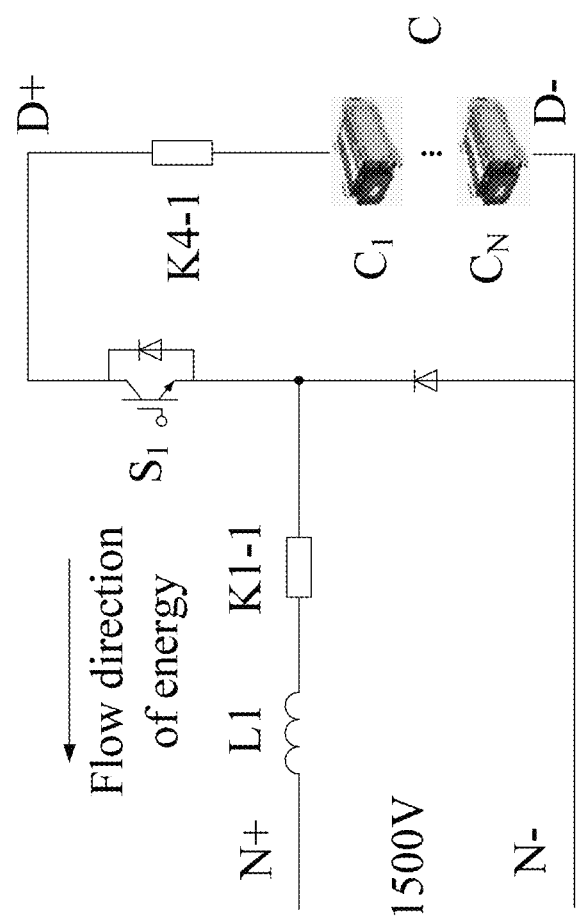
FIG. 5 is a schematic diagram showing an operating mode of instantaneous high-power energy release of an energy storage system according to one embodiment of the present disclosure.

FIG. 5 shows an operating mode of instantaneous high-power energy release of the energy storage system according to the present disclosure. In this process, the pre-stage circuit controls the first power electronic device $S_1$ through the PI control algorithm so that the pre-stage circuit operates in a bucking mode to feedback energy to the external DC system. In this process, the external energy shortage is too large. If the discharge current needs to exceed 150 A, the super-capacitor C can be utilized to release the current. After compensation for the large energy shortage, if sustained and steady release of energy is required, the system enters the operating mode as shown in FIG. 6.

Figure 6:
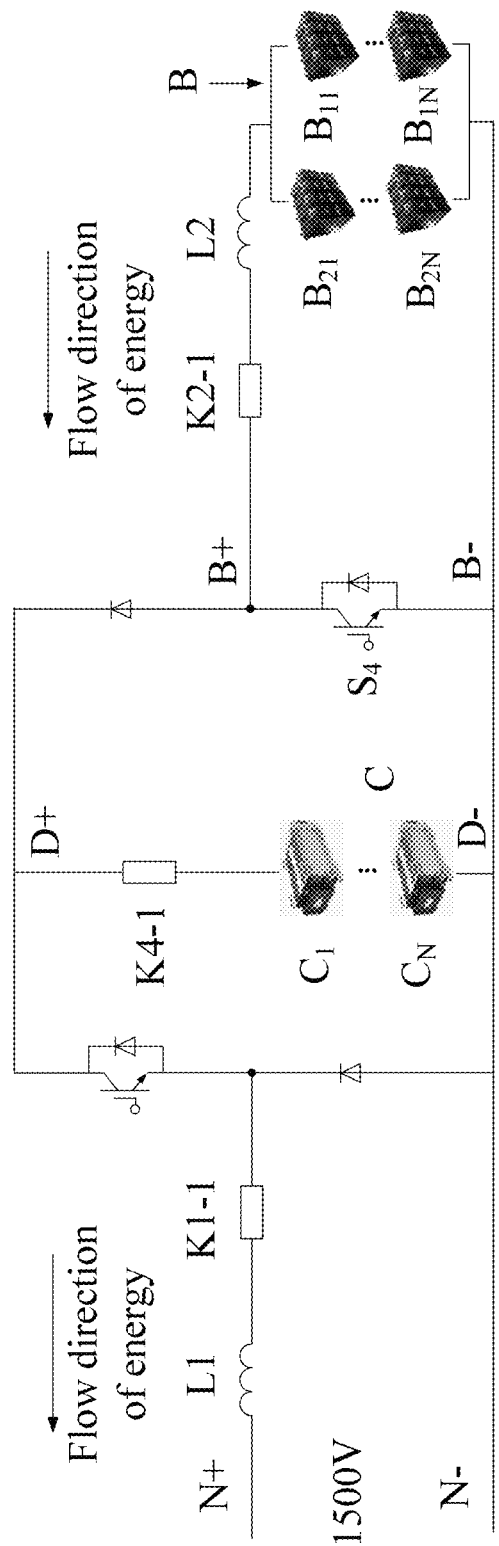
FIG. 6 is a schematic diagram showing an operating mode of normal state energy release of an energy storage system according to one embodiment of the present disclosure.

FIG. 6 is a schematic diagram showing an operating mode of normal state energy release of the energy storage system according to the present disclosure. In this process, the pre-stage circuit controls the first power electronic device $S_1$ through the PI control algorithm so that the circuit operates in a bucking mode to feedback energy to the external DC system. The post-stage circuit controls the fourth power electronic device $S_4$ through the PI control algorithm so that the circuit operates in a boosting mode to deliver the energy from the battery B to D+ and D− through the anti-parallel diode of the third power electronic device $S_3$ and maintain the voltage across the super-capacitor C at 1500 V.

Figure 7:
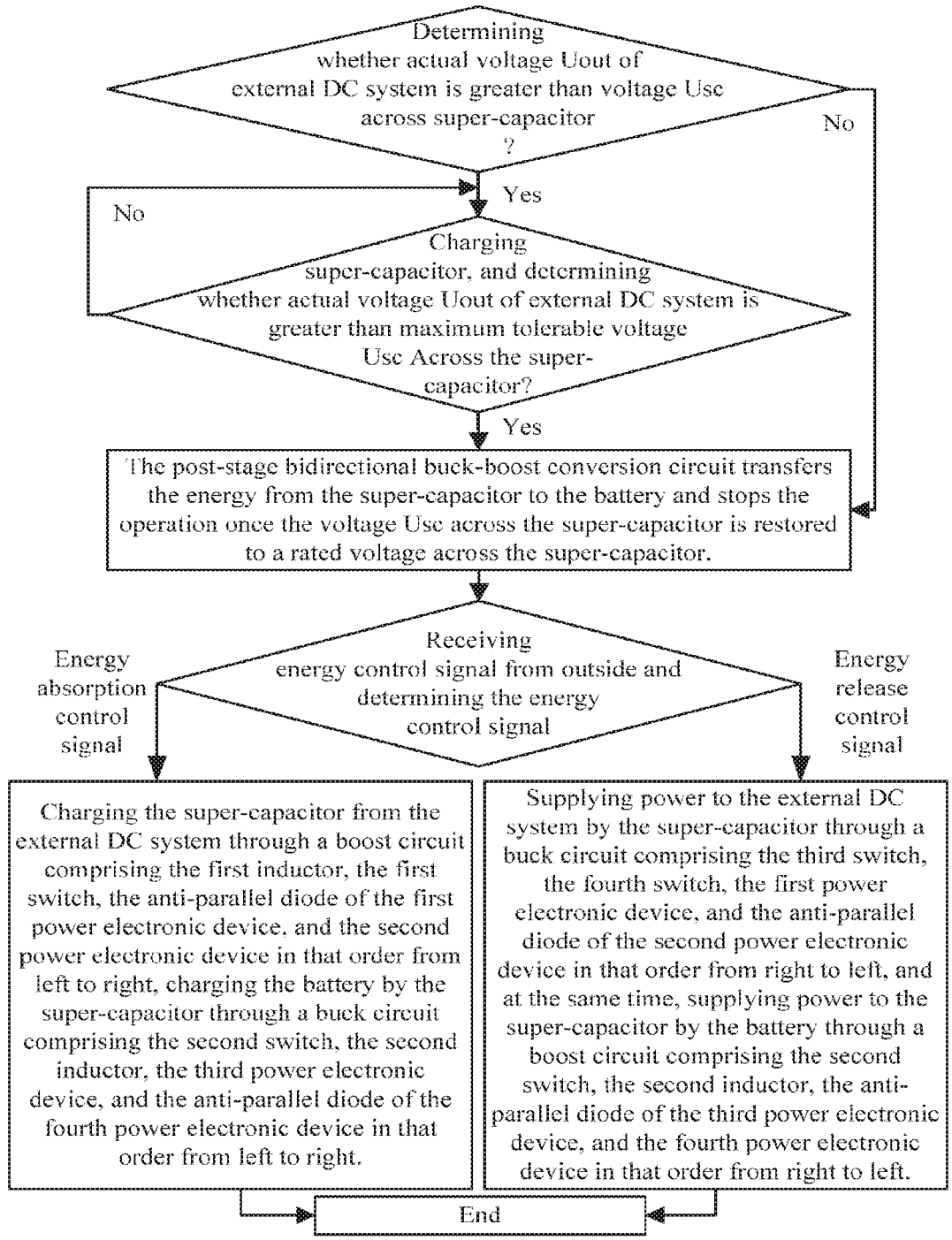
FIG. 7 is a flowchart of a method for using an energy storage system according to one embodiment of the present disclosure.

As shown in FIG. 7, the present disclosure further provides an operation method of the energy storage system mentioned above, the method comprising the following steps.

(1) It is determined whether the actual voltage Uout of the external DC system is greater or less than the voltage Usc across the super-capacitor. If it is greater, then proceed to (2). If it is less, then proceed to (3).

(2) The super-capacitor is continuously charged through the first inductor, the first switch, and the anti-parallel diode of the first power electronic device from the external DC system. It is determined whether the actual voltage Uout of the external DC system is greater than the maximum tolerable voltage Usc across the super-capacitor. If so, the first switch is turned off, so that the post-stage bidirectional buck-boost conversion circuit transfers the energy from the super-capacitor to the battery and stops its operation once the voltage Usc across the super-capacitor is restored to the rated voltage across the super-capacitor, and proceed to (3). If not, continue with the charging process.

(3) An energy control signal is received from the outside and it is determined whether the energy control signal is an energy absorption control signal or an energy release control signal. If it is an energy absorption control signal, then proceed to (4). If it is an energy release control signal, then proceed to (5).

(4) The super-capacitor is charged from the external DC system through a boost circuit comprising the first inductor, the first switch, the anti-parallel diode of the first power electronic device, and the second power electronic device in that order from left to right. The battery is charged by the super-capacitor through a buck circuit comprising the second switch, the second inductor, the third power electronic device, and the anti-parallel diode of the fourth power electronic device in that order from left to right. Charging ends when the energy in the battery is above a first threshold which is 10% to 15% of the energy capacity of the battery.

When the relationship between the actual voltage Uout of the external DC system and the voltage Usc across the super-capacitor satisfies the following formula during the charging process mentioned above, the first inductor, the first switch, the first power electronic device, and the second power electronic device stop their operation. At this time, the third power electronic device, the fourth power electronic device, the second capacitor, and the second inductor remain in a current operating mode and stop their operation when the voltage Usc across the super-capacitor is restored to the rated voltage across the super-capacitor:

$$U\text{out} < K\text{set3} \cdot U\text{sc}$$

where Kset3 is a threshold coefficient of a value less than or equal to 0.1, generally of a value taken as 0.1.

(5) Power is supplied to the external DC system by the super-capacitor through a buck circuit comprising the third switch, the fourth switch, the first power electronic device, and the anti-parallel diode of the second power electronic device in that order from right to left. At the same time, power is supplied to the super-capacitor by the battery through a boost circuit comprising the second switch, the second inductor, the anti-parallel diode of the third power electronic device, and the fourth power electronic device in that order from right to left. When the energy in the battery is below a second threshold, the process ends. The second threshold is 10% to 15% of the energy capacity of the battery.

The method of the present disclosure further comprises a process of pre-charging the energy storage system prior to (1) mentioned above, specifically comprising the following steps.

(A) When the hybrid energy storage device is not powered on, all the switches are turned off. Once the hybrid energy storage device is powered on, it is determined whether the relationship between the voltage Usc across the super-capacitor and the voltage Ub of the battery satisfies the following equation (1). If yes, it is indicated that the super-capacitor needs to be pre-charged, then the process proceeds to step B. Otherwise the process continues waiting and determining.

$$U_{sc} < K_{set1} \cdot U_b \qquad (1)$$

where Kset1 is a threshold coefficient of a value less than 1, generally of a value taken as 0.95.

B) The second switch and the fourth switch are turned on, and the super-capacitor is continuously charged by the battery through the boost circuit comprising the second inductor, the second switch, the third power electronic device, and the fourth switch.

C) It is determined whether the relationship between the voltage Usc across the super-capacitor and the rated voltage Uout rated of the external DC system satisfies the following equation (2). If yes, pre-charging of the super-capacitor is completed. Otherwise, the process continues waiting and determining.

$$U_{sc} > K_{set2} \cdot U_{out\_rated} \qquad (2)$$

where Kset2 is a threshold coefficient, with Kset2>1, generally of a value taken as 1.05.

D) Once the pre-charging is completed, the first switch and the third switch are turned on.

APPLICATION EXAMPLES

The energy storage system of the present disclosure has been put to practical use on the Komatsu Model 730 E off-highway mining dump truck, which has a rated power of 1490 kW, a curb weight of 140 tons, a payload of 180 tons, a rated voltage of 1500 V for the external DC system, a rated voltage of 1800 V for the super-capacitor, a rated voltage of 450 V for the battery, and a power of 300 kW. The first and second terminals of the pre-stage bidirectional buck-boost conversion circuit shown in FIG. 1 are respectively connected to the positive and negative electrodes of a DC electric wheel power supply system for the mining truck (i.e., the external DC system referred to in the present disclosure). The brake signal and throttle signal from the mining truck are input into the present device. When the truck driver brakes, the energy storage system proceeds to (4) of the operation method described above to absorb the brake energy generated by the DC electric wheel. When the truck driver accelerates, the energy storage system proceeds to (5) of the operation method described above to release the braking energy absorbed previously. In this way, energy saving and emission reduction can be achieved.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An energy storage system, comprising:
   a first switch and a first inductor connected in series and connected to a positive electrode of an external DC system;
   a pre-stage bidirectional buck-boost conversion circuit, the circuit comprising a first terminal, a second terminal, and a third terminal, the first terminal being connected to the first switch and the second terminal being connected to a negative electrode of the external DC system;
   a pre-charge circuit, a fourth switch, and a super-capacitor sequentially connected in series, two terminals of a series structure resulting therefrom being connected to the third terminal of the pre-stage bidirectional buck-boost conversion circuit and the negative electrode of the external DC system, respectively;
   a post-stage bidirectional buck-boost conversion circuit, the circuit comprising a first terminal, a second terminal, and a third terminal, the second terminal and the third terminal of the post-stage bidirectional buck-boost conversion circuit being connected to the second terminal and the third terminal of the pre-stage bidirectional buck-boost conversion circuit, respectively; and
   a battery, a second switch, and a second inductor connected in series, two terminals of a series structure resulting therefrom being connected to the first terminal of the post-stage bidirectional buck-boost conversion circuit and the negative electrode of the external DC system, respectively.

2. The system of claim 1, wherein the pre-stage bidirectional buck-boost conversion circuit comprises a first power electronic device and a second power electronic device; the post-stage bidirectional buck-boost conversion circuit comprises a third power electronic device and a fourth power electronic devices; and each of the first power electronic device, the second power electronic device, the third power electronic device, and the fourth power electronic device comprises an IGBT transistor and an anti-parallel diode connected in parallel with each other.

3. A method for absorbing and releasing energy by using an energy storage system of claim 2, the method comprising:
   when the energy storage system is in an energy absorption state:
   1) when the external DC system generates energy feedback, in the event of impact from an instantaneous surge current, charging the super-capacitor directly through the second power electronic device;
   2) when the surge ends or if no impact from a surge current occurs in the charging process, performing PWM control on the second power electronic device, so that the pre-stage bidirectional buck-boost conversion circuit operates in a boosting mode to absorb energy; and performing PWM control on the third power electronic device, so that the post-stage bidirectional buck-boost conversion circuit functions as a buck circuit to charge the battery; and
   3) if the voltage of the super-capacitor is higher than a rated value at the end of the charging control, performing PWM control on the third power electronic device so that the post-stage bidirectional buck-boost conversion circuit continues to function as a buck circuit until the voltage of the super-capacitor is restored to a rated value in preparation for a next energy absorption;
   when the energy storage system is in an energy release state:

1) when an instantaneous large power shortage occurs in the external DC system, controlling the first power electronic device to complete instantaneous high-current energy delivery from the super-capacitor to the external DC system;
2) when compensation for the large power shortage is completed or no large power shortage occurs in the charging process, performing PWM control on the first power electronic device so that the pre-stage bidirectional buck-boost conversion circuit operates in a bucking mode to output a discharge current; and performing PWM control on the fourth power electronic device so that the post-stage bidirectional buck-boost conversion circuit functions as a boost circuit to maintain the voltage of the super-capacitor; and
3) at the end of the discharge control, if the voltage of the super-capacitor is lower than a rated value, performing PWM control on the fourth power electronic device so that the post-stage bidirectional buck-boost conversion circuit functions as a boost circuit until the voltage of the super-capacitor is restored to a rated value in preparation for a next energy release.

4. A method for using an energy storage system of claim 2, the method comprising:
(1) determining whether an actual voltage Uout of the external DC system is greater or less than a voltage Usc across the super-capacitor, and proceeding to (2) if it is greater, and proceeding to (3) if it is less;
(2) continuously charging the super-capacitor via the external DC system through the first inductor, the first switch, and the anti-parallel diode of the first power electronic device, and determining whether the actual voltage Uout of the external DC system is greater than a maximum tolerable voltage Usc across the super-capacitor; and if so, turning off the first switch, so that the post-stage bidirectional buck-boost conversion circuit transfers the energy from the super-capacitor to the battery and stops the operation once the voltage Usc across the super-capacitor is restored to a rated voltage across the super-capacitor, and proceeding to (3), if not, continuing with the charging process;
(3) receiving an energy control signal from the outside and determining whether the energy control signal is an energy absorption control signal or an energy release control signal, and if it is an energy absorption control signal, proceeding to (4), and if it is an energy release control signal, proceeding to (5);
(4) charging the super-capacitor from the external DC system through a boost circuit comprising the first inductor, the first switch, the anti-parallel diode of the first power electronic device, and the second power electronic device in that order from left to right, charging the battery by the super-capacitor through a buck circuit comprising the second switch, the second inductor, the third power electronic device, and the anti-parallel diode of the fourth power electronic device in that order from left to right, wherein charging ends when energy in the battery is above a first threshold; and
(5) supplying power to the external DC system by the super-capacitor through a buck circuit comprising the third switch, the fourth switch, the first power electronic device, and the anti-parallel diode of the second power electronic device in that order from right to left, and at the same time, supplying power to the super-capacitor by the battery through a boost circuit comprising the second switch, the second inductor, the anti-parallel diode of the third power electronic device, and the fourth power electronic device in that order from right to left, wherein the process ends when energy in the battery is below a second threshold.

5. The method of claim 4, further comprising a pre-charging process of the energy storage system prior to step (1), said pre-charging process comprising sub-steps of:
a) when the hybrid energy storage device is not powered on, turning off all switches, and once the hybrid energy storage device is powered on, determining whether the relationship between the voltage Usc across the super-capacitor and a voltage Ub of the battery satisfies the following equation (1), proceeding to sub-step b) if yes, otherwise continuing waiting and determining:

$$Usc < Kset1 \cdot Ub \quad (1)$$

where Kset1 is a threshold coefficient of a value less than 1;
b) turning on the second switch and the fourth switch, and charging the super-capacitor continuously by the battery through a boost circuit comprising the second inductor, the second switch, the third power electronic device, and the fourth switch;
c) determining whether the relationship between the voltage Usc across the super-capacitor and a rated voltage Uout rated of the external DC system satisfies the following equation (2), and ending pre-charging of the super-capacitor if yes, otherwise continuing waiting and determining:

$$Usc < Kset2 \cdot Uout\_rated \quad (2)$$

where Kset2 is a threshold coefficient, with Kset2>1; and
d) turning on the first switch and the third switch once the pre-charging is completed.

6. The method of claim 4, wherein
when the actual voltage Uout of the external DC system and the voltage Usc across the super-capacitor satisfy the following formula during charging in step (4): Uout<Kset3·Usc, where Kset3 is a threshold coefficient of a value less than or equal to 0.1, the first inductor, the first switch, the first power electronic device, and the second power electronic device stop operations thereof; the third power electronic device, the fourth power electronic device, the second capacitor, and the second inductor remain in a current operating mode and stop operation once the voltage Usc across the super-capacitor is restored to the rated voltage across the super-capacitor.

7. The system of claim 1, wherein the first inductor and the second inductor are both smoothing inductors.

8. The system of claim 1, wherein the first switch, the second switch, and the fourth switch are independently selected from the group consisting of a circuit breaker, a contactor, a load switch, a fuse, and any combination thereof.

9. The system of claim 1, wherein the pre-charge circuit comprises a third switch connected in series with the super-capacitor and a charging resistor connected in parallel with the third switch.

10. The system of claim 9, wherein the third switch is a selected from the group consisting of a circuit breaker, a contactor, a load switch, a fuse and any combination thereof.

* * * * *